United States Patent [19]

Kittle et al.

[11] 4,170,113
[45] Oct. 9, 1979

[54] HYDRAULIC SYSTEM WITH UNLOADING VALVE ASSEMBLY

[75] Inventors: Carl E. Kittle; Richard A. Wittren, both of Cedar Falls, Iowa

[73] Assignee: Deere & Company, Moline, Ill.

[21] Appl. No.: 889,650

[22] Filed: Mar. 24, 1978

[51] Int. Cl.² .................... F15B 11/16; F15B 21/04
[52] U.S. Cl. ........................ 60/427; 60/454; 60/464; 60/484
[58] Field of Search ............. 60/427, 453, 454, 464, 60/484

[56] References Cited

U.S. PATENT DOCUMENTS

| 3,520,322 | 7/1970 | Kaptur | 137/116.3 |
|---|---|---|---|
| 3,973,398 | 8/1976 | Kittle | 60/427 |

*Primary Examiner*—Edgar W. Geoghegan

[57] ABSTRACT

A hydraulic system having a reservoir fed charge pump supplying pressurized fluid through a filter to a supply pump for direction controlled fluid devices includes an unloading valve assembly on the return passage from the devices for limiting back pressure therefrom as long as the charge pump supplies sufficient pressurized fluid for the supply pump. The unloading valve assembly includes an unloading valve movable in response to the pressurized fluid at the connection between the supply pump and the filter to unload the return passage by connecting it to the reservoir and further to control the pressurized fluid going to the filter by connecting the charge pump to the reservoir at a predetermined maximum pressure of pressurized fluid. As the devices require more fluid from the supply pump causing the pressure to the supply pump to drop, the unloading valve first blocks the charge pump from the reservoir and then the return passage. After the return passage has been blocked, the pressure therein rises to activate a makeup valve provided in the unloading valve assembly which connects the return passage to between the charge pump and the filter to cause return fluid from the devices to feed directly to the supply pump. The unloading valve assembly further includes a signal valve which responds to a predetermined pressure differential across the filter to provide a signal indicative of a clogged filter and to cause the unloading valve to connect both the return passage and the charge pump to the reservoir.

8 Claims, 1 Drawing Figure

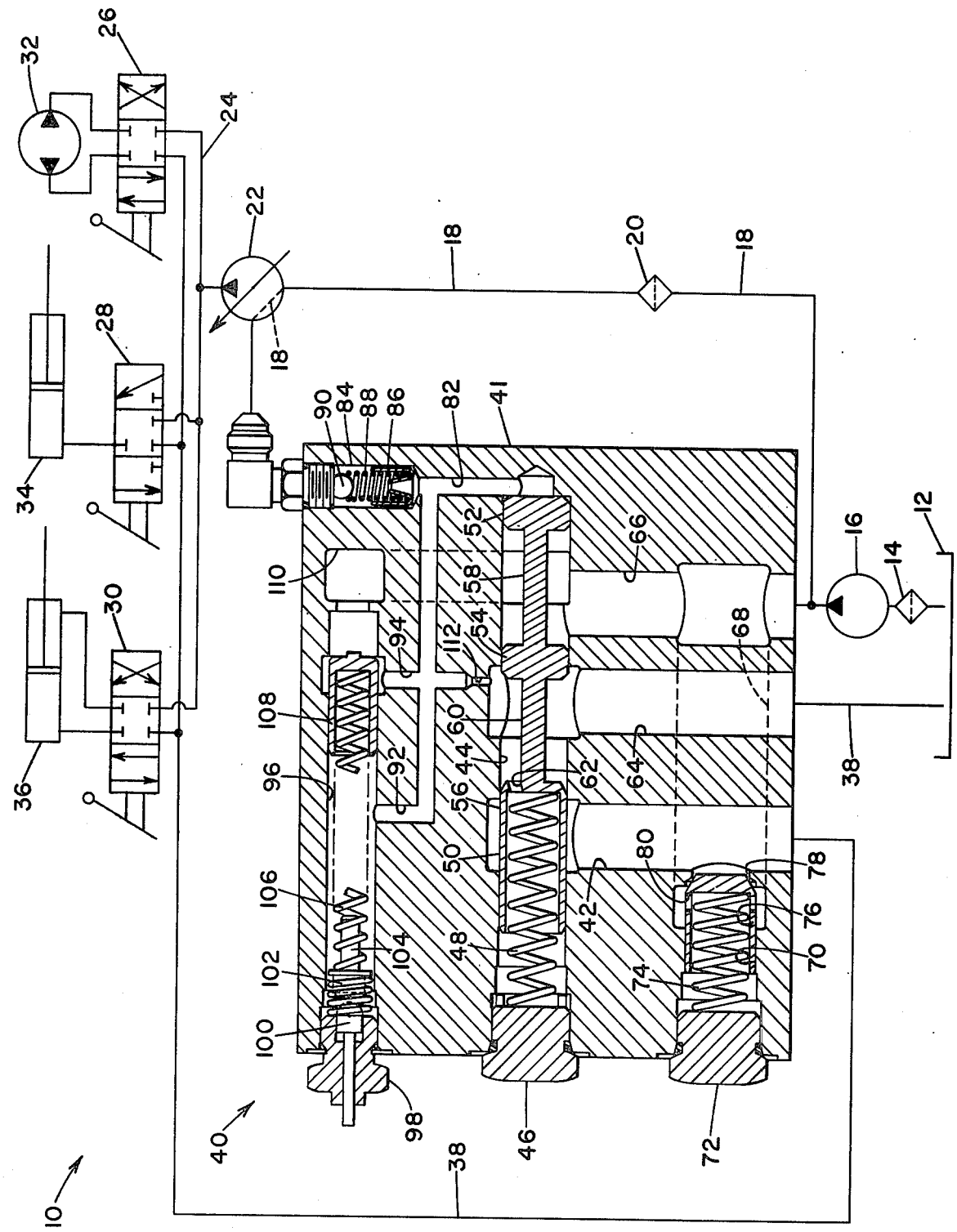

HYDRAULIC SYSTEM WITH UNLOADING VALVE ASSEMBLY

BACKGROUND OF THE INVENTION

In the past, a direction control valve was used which was operative to automatically direct the exhaust of a single acting function to the fluid reservoir and to direct the exhaust of continuously acting and/or double acting functions to a charging circuit for the supply pump as described in the U.S. Pat. No. 3,973,398 granted to C. E. Kittle on Aug. 10, 1976.

An accepted disadvantage of the prior art is that the exhaust of continuously acting and/or double acting functions must be at the same pressure as the charge circuit so that the exhaust fluid can provide the bulk of the fluid feeding the supply pump. Since the useable pressure for a function is the difference between its supply and exhaust pressures, it is evident that a power penalty exists in the form of the difference between reservoir and exhaust pressures. Where it has been desired to increase function power output without increasing the size of the function device itself, those skilled in the art have increased the supply pressure by providing a larger pump with the acceptance of this power penalty.

SUMMARY OF THE INVENTION

The present invention provides an unloading valve added to the return circuit of a high pressure hydraulic system. This valve routes all flow from the single acting, double acting, and/or continuously acting devices or functions as well as the charge pump directly to the reservoir whenever the pressure at the inlet of the supply pump is above a predetermined maximum level. As the pressure drops because of usage at the various functions, the pressure drops causing the valve to route more fluid from the charge pump to the supply pump to return the pressure to the predetermined maximum level. As all functions begin to operate, the valve will operate to block the exhaust fluid and the charge pump from the reservoir and a makeup valve will cause the exhaust fluid to feed into the charge circuit.

The present invention further provides signal valving which is responsive to the pressure differential across a filter disposed between the charge and supply pump to provide a signal indicative of the clogging of the filter. The signal valving further operates to connect the charge pump directly to the reservoir when the filter is clogged.

The present invention further provides a hydraulic system in which the bulk of the fluid is returned to the reservoir so as to provide filtration through a charge pump filter as well as a supply pump filter so as to extend the life of the supply pump filter.

The present invention still further provides adequate cold weather protection by providing for circulation of exhaust fluid whenever the charge pump has difficulty providing enough pressurized fluid for the supply pump.

The present invention still further provides for lower standby losses because lower system pressures can be used to provide the same power output.

The above and additional advantages of the present invention will become apparent to those skilled in the art from a reading of the following detailed description when taken in conjunction with the accompanying drawing.

BRIEF DESCRIPTION OF THE DRAWING

The drawing is a schematic illustration partially in section of the hydraulic system of the present invention.

DESCRIPTION OF THE PREFERRED EMBODIMENT

Referring now to the drawing, therein is shown a hydraulic system 10 which includes a fluid reservoir 12 containing fluid to be drawn through a charge pump filter 14 by a charge pump 16. The charge pump 16 is connected to a charge passage 18 which has disposed therein a main filter 20. The charge passage 18 is further connected to a supply pump 22 which in addition to internally carrying the charge passage 18 supplies fluid to a supply passage 24.

The supply passage 24 is connected to a series of direction control valves 26, 28, and 30 which in the preferred embodiment are respectively connected to a reversible hydraulic motor 32, a single acting cylinder 34, and a double acting cylinder 36. The direction control valves 26, 28, and 30 are further connected to a return passage 38. The return passage 38 is connected to the fluid reservoir 12 and has disposed in it an unloading valve assembly 40.

The unloading valve assembly 40 includes a valve body 41 which contains a return passageway 42 which is connected to the return passage 38. The return passageway 42 in turn is connected to an unloading valve bore 44 which is plugged at one end by a plug 46 against which is seated a spring 48. The spring 48 biases an unloading valve spool 50 against the far end of the unloading valve bore 44. For convenience, the convention will be used that the viewer's right will be considered the right side of the valve and the viewer's left will be considered the left, thus it will be seen that the unloading valve spool 50 abuts the right end of the unloading valve bore 44.

The unloading valve spool 50, starting from the right has first, second and third lands 52, 54, and 56 separated by first and second grooves 58 and 60. A passage 62 is disposed through the third land 56 so as to connect the spring side of the unloading valve spool 50 to a reservoir passageway 64 which is parallel to and adjacent the return passageway 42. The reservoir passageway 64 is connected to the remainder of the return passage 38 which is connected to the reservoir 12. Parallel to and adjacent the reservoir passageway 64 is a main charge passageway 66 which connects the unloading valve bore 44 to the charge passage 18.

The main charge passageway 66 is connected by a makeup passageway 68 to a makeup valve bore 70 which is plugged at one end by a plug 72 against which a spring 74 abuts. The spring 74 biases a makeup valve spool 76 against the right end of the makeup valve bore 70 in which is provided an opening 78 which is connected to the return passageway 42. The makeup valve spool 76 is further provided with passages 80 which fluidly connect the makeup passageway 68 to the spring side of the makeup valve spool 76.

Returning now to the unloading valve bore 44, the right end of the bore is connected to a check valve passageway 82 which is connected to a check valve 84. The check valve 84 contains a conventional retainer 86, a spring 88, and a ball 90 to allow flow from the charge passage 18 to the check valve passageway 82 and prevent flow in the reverse direction.

The check valve passageway 82 is connected to first and second passageways 92 and 94 which are spaced apart and connected to a signal valve bore 96 provided in the valve body 41. The signal valve bore 96 is plugged at one end by a plug 98 which includes a sealed signal plunger 100. Abutting the plug 98 is a spring 102 which abuts a spacer pin 104. The spacer pin 104 further abuts a spring 106 which biases a signal valve spool 108 against the right end of the signal valve bore 96. The right end of the signal valve bore 96 is further connected by a signal charge passageway 110 to the unloading valve bore 44 and thence to the main charge passageway 66.

The first and second passageways 92 and 94 and the check valve passageway 82 are commonly connected by an orifice 112 to the reservoir passageway 64.

During operation of the hydraulic system 10, when all the direction control valves 26, 28, and 30 are in the closed position shown, the charge pump 16 will provide pressurized fluid to the charge passage 18 which will be at a predetermined maximum pressure level because of the flow through the check valve 84, subject to a loss through to the orifice 112 and the reservoir passageway 64, which imparts a pressure to the right hand end of the unloading valve bore 44 which compresses the spring 48 and shifts the unloading valve spool 50 to its extreme left hand position.

With the unloading valve spool 50 in its left hand position, the return passageway 42 and a main charge passageway 66 are connected to the reservoir passageway 64 by the first and second grooves 58 and 60, respectively. In this position, the exhaust fluid from the direction control valves are connected to the reservoir 12 and only that pressure required at the supply pump 22 is maintained with the remainder being diverted through the main charge passageway 66 into the reservoir passageway 64.

As one of the functions starts to draw fluid from the supply pump 22, as for example the double acting cylinder 36, the pressure of pressurized fluid in the charge passage 18 will be slightly reduced. This reduction below the maximum predetermined pressure level causes a reduction in the pressure in the check valve passageway 82 and causes movement of the unloading valve spool 50 to the right. This movement causes a metering of fluid from the main charge passageway 66 across the second land 54 of the unloading valve spool 50 and causes a corresponding increase in the pressure in the charge passageway 18 to counteract the reduction caused by the draw from the supply pump 22.

As more fluid is required from the supply pump 22, as for example if the double acting cylinder 36 as well as the reversible hydraulic motor 32 were in operation, the pressure of pressurized fluid in the charge passage 18 would be further reduced causing the pressure in the right hand end of the unloading valve bore 44 to reach the point where the second land 54 of the unloading valve spool 50 would block the main charge passageway 66 from the reservoir passageway 64 causing the full output of the charge pump 16 to be inputted to the charge passage 18. It will be noted that the return passage 38 will still be connected to the reservoir passageway 64 allowing the functions to operate with the exhausts of the functions operating against fluid reservoir pressure.

As the full output of the supply pump 22 is required with all functions in operation, as for example when both single and double acting cylinders 34 and 36 as well as the reversible hydraulic motor 32 are in operation, the pressure of pressurized fluid in the charge passage 18 will be reduced past a predetermined minimum pressure level. The reduction of pressure in the charge passage 18 causes the unloading valve spool 50 to move to the right causing the third land 56 to initially meter and then block return passageway 42 from the reservoir passageway 64. As a result of a blockage, pressure in the return passageway 38 will increase. When the pressure in the return passage 38 reaches a predetermined low pressure level which is a function of the difference between the pressure in the return passageway 42 and the pressure in the charge passageway 18 plus the force of the spring 74, the opening 78 will be unblocked by the makeup valve spool 76 so as to allow fluid from the return passageway 42 to enter the makeup passageway 68 and supplement the fluid in the main charge passageway 66.

With the opening of the makeup valve spool 76, the exhaust fluid from the various functions is added directly to the charge passage 18 so that the charge pump 16 only has to make up that fluid which is required by the single acting cylinder 34.

As the various functions are shut down, the sequence of operation will reverse itself such that the exhausts of the functions will first be connected to the fluid reservoir and then the charge pump will be connected to the reservoir 12 also.

One additional advantage of this system, is that fluid for the most part is returned to the reservoir 12 such that it is drawn up by the charge pump 16 through both the charge pump filter 14 as well as the main filter 20 so as to prolong the filter life of the main filter 20 and provide a cleaner system.

The unloading valve assembly 40 is connected across the main filter 20 so as to be capable of providing a visual indication of when the main filter 20 is clogged as well as preventing operation of the functions when the filter is clogged. As the main filter 20 clogs, the pressure on the charge pump side increases causing the pressure in the main and signal charge passageways 66 and 110 to increase. At a predetermined pressure difference across the main filter 20 as sensed by the pressure in the signal charge passageway 110 being greater than that sensed through the first passageway 92 plus the force of the spring 106, the signal valve spool 108 opens, and the spring 102 is compressed causing the spacer pin 104 to press the signal plunger 100 to the left causing the stem of the signal plunger 100 to extend indicating that the filter is clogged. The pressurized fluid from the signal charge passageway 110 is then transmitted through the first and second passageways 92 and 94 to the check valve passageway 82 causing the unloading valve spool 50 to move to the left to the position in which the main charge passageway 66 is connected to the reservoir passageway 64.

After the main filter 20 is cleaned, the unloading valve assembly 40 automatically resets itself for normal operation.

While the invention has been described in conjunction with a specific embodiment, it is to be understood that many alternatives, modifications, and variations will be apparent to those skilled in the art in light of the foregoing description. Accordingly, it is intended to embrace all such alternatives, modifications, and variations which fall within the spirit and scope of the appended claims.

We claim:

1. A hydraulic system comprising: A fluid reservoir; a charge pump having an inlet connected to the reservoir and an outlet for providing pressurized fluid; a charge passage connected to the outlet of the charge pump; a supply pump having an inlet connected to the charge passage and an outlet for providing high pressure fluid; a supply passage connected to the outlet of the supply pump; fluid function means having an inlet connected to the supply passage for using the high pressure fluid from the supply passage and having an outlet for exhausting low pressure fluid therefrom; a return passage connected to the outlet of the fluid function means; unloading valve means connected to the return passage, the reservoir, and the charge passage normally blocking the return passage and the charge passage from the reservoir responsive to a predetermined pressure level of pressurized fluid in the charge passage to connect the return passage to the reservoir; and makeup valve means connected between the return passage and the charge passage responsive to a predetermined pressure level of low pressure fluid in the return passage caused by the blocking of the return passage from the reservoir to connect the return passage to the charge passage whereby the unloading valve means connects the return passage to the reservoir when the predetermined pressure level of pressurized fluid in the charge passage is reached and the makeup valve means connects the return passage to the charge passage when the predetermined pressure level of low pressure fluid is reached.

2. The hydraulic system as claimed in claim 1 wherein the unloading valve means includes means for connecting the charge passage to the reservoir in response to a second predetermined pressure level of pressurized fluid in the charge passage whereby the return and charge passages are connected to the reservoir when the second predetermined pressure level of pressurized fluid is reached.

3. The hydraulic system as claimed in claim 2 including filter means disposed in the charge passage between the charge pump and the unloading valve means connection to the charge passage; check valve means disposed in the connection between the unloading valve means and charge passage for preventing the flow of pressurized fluid from the unloading valve means to the charge passage; signal valve means connected to the charge passage between the charge pump and the filter and to the unloading valve means proximate the check valve means responsive to a predetermined pressure differential between the pressure of the pressurized fluid in the charge passage between the charge pump and the filter and in the charge passage between the filter and the supply pump to connect the pressurized fluid in the charge passage between the charge pump and the filter to the unloading valve means whereby the unloading valve means connects the charge pump to the reservoir; and signal means responsive to the signal valve means in response to the predetermined pressure differential to provide a signal indicative thereof.

4. A hydraulic system comprising: a fluid reservoir; a charge pump having an inlet connected to the reservoir and an outlet for providing pressurized fluid; a charge passage connected to the outlet of the charge pump; a supply pump having an inlet connected to the charge passage and an outlet for providing high pressure fluid; a supply passage connected to the outlet of the supply pump; fluid function means having an inlet connected to the supply passage for using the high pressure fluid from the supply passage and having an outlet for exhausting low pressure fluid therefrom; a return passage connected to the outlet of the fluid function means; a valve body having an unloading valve bore provided therein with a first end connected to the charge passage, said valve body having return, reservoir, and charge passageways provided therein connected to the unloading valve bore and respectively connected to the return passage, the reservoir, and the charge passage, said valve body having a makeup valve bore provided therein having a first end connected to the return passageway and a portion proximate the first end connected to the charge passageway; an unloading valve spool disposed in the unloading valve bore and biased towards the first end thereof, said unloading valve spool slidable from the first end of the unloading valve bore in response to a predetermined pressure level of pressurized fluid in the charge passage, said unloading valve spool having land and groove means provided therein for selectively and sequentially blocking and connecting the return passageway from and to the reservoir passageway as the unloading valve spool slides away from the first end of the unloading valve bore; and a makeup valve spool disposed in the makeup bore and biased towards the first end thereof to block the return passageway from the charge passageway, said makeup valve spool responsive to a predetermined pressure level of low pressure fluid occurring when the unloading valve spool blocks the return passageway from the reservoir passageway to connect the return passageway to the charge passageway whereby the low pressure fluid from the function means is added to the pressurized fluid in the charge passage or returned to the reservoir when the predetermined pressure level of pressurized fluid in the charge passage is respectively not reached or exceeded.

5. The hydraulic system as claimed in claim 4 wherein said unloading valve spool includes additional land and groove means for selectively and sequentially blocking and connecting the charge passageway and the reservoir passageway as the unloading valve spool slides away from the first end of the unloading valve bore in response to a second predetermined pressure level of pressurized fluid in the charge passage so that the second predetermined pressure level is not exceeded in the charge passage.

6. The hydraulic system as claimed in claim 5 including a filter disposed in the charge passage between the charge and supply pumps and wherein said valve body has a check valve bore provided therein having a first end connected to the charge passage proximate the supply pump and a second end connected to the first end of said unloading valve bore, said valve body having a signal valve bore provided therein having first and second ends, the first end connected to the charge passageway, and having first and second spaced apart passageway means provided therein and commonly connected to the second end of the check valve bore, said valve body having an orifice provided therein connecting the first and second passageway means to the reservoir passageway; check means disposed in said check valve bore for preventing the flow of pressurized fluid from the second end of said check valve bore to the first end thereof; a signal valve spool disposed in said signal valve bore between the first end thereof and the first passageway means and blocking the second passageway means therefrom, said signal valve spool biased towards the first end of said signal valve bore and responsive to a predetermined pressure differential between the pressure of pressurized fluid in the charge passgeway and in the first passageway means to slide to connect the charge passageway to the first and second passageway means whereby the charge passageway is connected to the reservoir passageway by the unloading valve spool above the predetermined pressure differential; and signal means responsive to the signal valve spool sliding to provide a signal indicative thereof.

7. A hydraulic system comprising: a fluid reservoir; a charge pump having an inlet connected to the reservoir and an outlet for providing pressurized fluid; a charge passage connected to the outlet of the charge pump; a supply pump having an inlet connected to the charge passage and an outlet for providing high pressure fluid; a supply passage connected to the outlet of the supply pump; fluid function means having an inlet connected to the supply passage for using the high pressure fluid and having an outlet for exhausting low pressure fluid therefrom; a return passage connected to the outlet of the function means; a valve body having an unloading valve bore provided therein, said unloading valve bore having a first end connected to the charge passage proximate the supply pump and a second closed end; said valve body having return, reservoir, and charge passageways provided therein respectively connected to the return passage, the reservoir, and the charge passage with said return, reservoir, and charge passageways intersecting the unloading valve bore respectively distally spaced from the first end of the unloading valve bore, said valve body having a makeup valve bore provided therein having a first end connected to the return passageway and a second end connected to the charge passageway; an unloading valve spool slidably disposed in the unloading valve bore normally blocking the first end thereof from the second end; said unloading valve spool having first and second spaced apart groove means provided therein positionable in a first position blocking the return and charge passage from the reservoir passageway, in a second position connecting the return passageway to the reservoir passageway while blocking the charge passage from the reservoir passageway, and in a third position connecting the return and charge passageways to the reservoir passageway; first biasing means disposed between the unloading valve spool and the second end of the unloading valve bore for normally holding the unloading valve spool in the first position and allowing the unloading valve spool to be moved to the second and third positions in response respectively to first and second pressure levels of pressurized fluid in the charge passage proximate the supply pump; a makeup valve spool slidably disposed in the makeup valve bore; second biasing means disposed between the makeup valve spool and the second end of the makeup valve bore for normally holding the makeup valve spool in a first position blocking the return passageway from the charge passageway and allowing the makeup valve spool to be moved to a second position connecting the return and charge passageways when the pressure of the low pressure fluid exceeds the pressure of the pressurized fluid by a predetermined amount whereby the outlets of the charge pump and function means are connected to the reservoir when the pressure of the pressurized fluid in the charge passage is above the second predetermined pressure level, the outlet of the charge pump is subsequently blocked from the reservoir when the pressure of the pressurized fluid in the charge passage is below the second predetermined pressure level, and the outlet of the function means is subsequently blocked from the reservoir when the pressure of the pressurized fluid in the charge passage is below the first predetermined pressure level causing the low pressure to increase until it exceeds the pressure of the pressurized fluid by a predetermined amount so that the low pressure fluid supplements the pressurized fluid.

8. The hydraulic system as claimed in claim 7 including a filter disposed in the charge passage between the charge and supply pumps and wherein said valve body has a check valve bore provided therein having a first end connected to the charge passage proximate the supply pump and a second end connected to the first end of said unloading valve bore, said valve body having a signal valve bore provided therein having first and second ends, the first end connected to the charge passageway, and having first and second spaced apart passageway means provided therein and commonly connected to the second end of the check valve bore, said valve body having an orifice provided therein connecting the first and second passageway means to the reservoir passageway; check means disposed in said check valve bore for preventing the flow of pressurized fluid from the second end of said check valve bore to the first end thereof; a signal valve spool disposed in said signal valve bore between the first end thereof and the first passageway means and blocking the second passageway means therefrom, said signal valve spool biased towards the first end of said signal valve bore and responsive to a predetermined pressure differential between the pressure of pressurized fluid in the charge passageway and in the first passageway means to slide to connect the charge passageway to the first and second passageway means whereby the charge passageway is connected to the reservoir passageway by the unloading valve spool above the predetermined pressure differential; and signal means responsive to the signal valve spool sliding to provide a signal indicative thereof.

* * * * *